No. 674,351. Patented May 14, 1901.
C. H. ATKINS.
LIQUID ELEVATING APPARATUS.
(Application filed Feb. 11, 1901.)
(No Model.) 2 Sheets—Sheet 1.

WITNESSES:
INVENTOR:
Charles H. Atkins
By
Atty.

No. 674,351. Patented May 14, 1901.
C. H. ATKINS.
LIQUID ELEVATING APPARATUS.
(Application filed Feb. 11, 1901.)
(No Model.) 2 Sheets—Sheet 2.

Witnesses:
H. B. Hallock.
A. M. Kelly.

Inventor:
Charles H. Atkins
By [signature]
Atty.

UNITED STATES PATENT OFFICE.

CHARLES H. ATKINS, OF CAMDEN, NEW JERSEY, ASSIGNOR TO WARREN WEBSTER, OF MERCHANTVILLE, NEW JERSEY.

LIQUID-ELEVATING APPARATUS.

SPECIFICATION forming part of Letters Patent No. 674,351, dated May 14, 1901.

Application filed February 11, 1901. Serial No. 46,849. (No model.)

*To all whom it may concern:*

Be it known that I, CHARLES H. ATKINS, of Camden, county of Camden, State of New Jersey, have invented an Improvement in Liquid-Elevating Apparatus, of which the following is a specification.

My invention relates to liquid-elevating apparatus, and is fully set forth in the following specification and shown in the accompanying drawings.

It is the object of my invention to facilitate the elevation of liquids by atmospheric pressure, whereby the liquid may be raised to a greater elevation with a given partial vacuum.

It is well known that the height to which a body of liquid may be raised by atmospheric pressure—i. e., suction—may be materially increased by aeration of the liquid or by dividing up the column by air pistons or bubbles; and my invention relates to the means for introducing the air into the column of water to be elevated.

It is one of my objects to enable the amount of air admitted to be controlled, so that the possibility of destroying or materially reducing the partial vacuum in the liquid-conduit when the same is not filled with liquid will be avoided.

It is also an object of my invention to prevent the escape of any material quantity of water through the air-vent if the partial vacuum is for any reason broken or materially reduced.

One of the applications of my invention is for lifting water of condensation from a trap or radiating device, and it is one of my objects to effectively prevent the escape of steam through the air-inlet when for any reason steam enters the water-conduit.

In carrying out my invention I provide the water conduit or pipe with a section or portion having walls formed of porous material, through which the air in limited volumes may be drawn by the suction in the pipe, but which is impervious to steam and through which only limited quantities of water may pass.

My invention further consists in inclosing this porous portion or section by a cover or casing having an air-inlet to collect the water which may pass through the porous wall, as well as to protect the porous wall against fracture.

My invention also relates to other features of construction and combination of parts, which are fully set forth in the claims.

Figure 1:
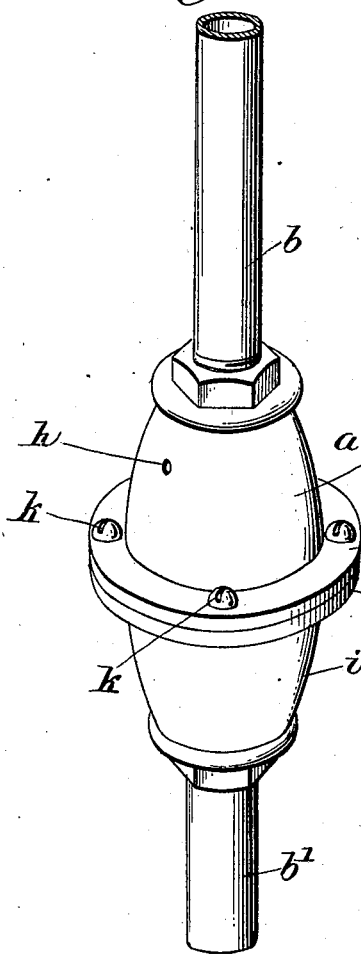
Figure 2:
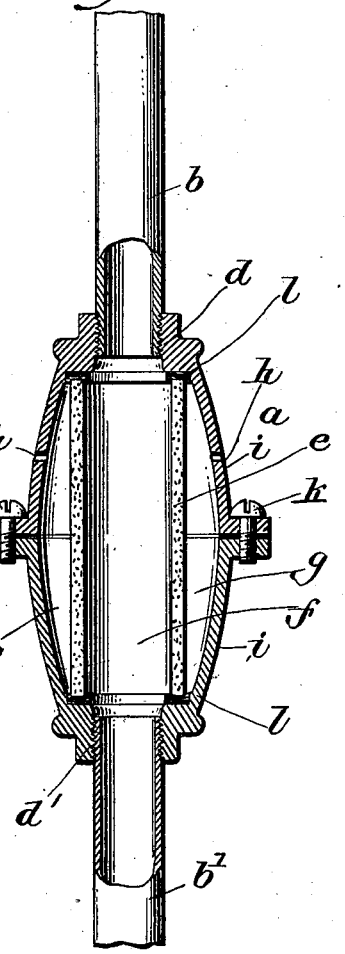
Figure 3:
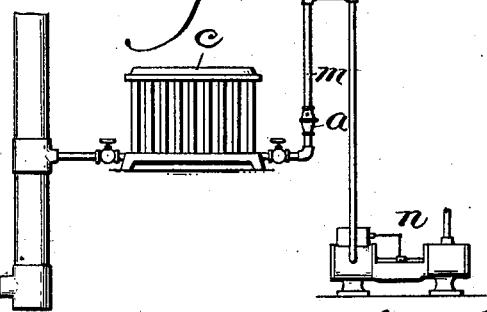
Figure 4:
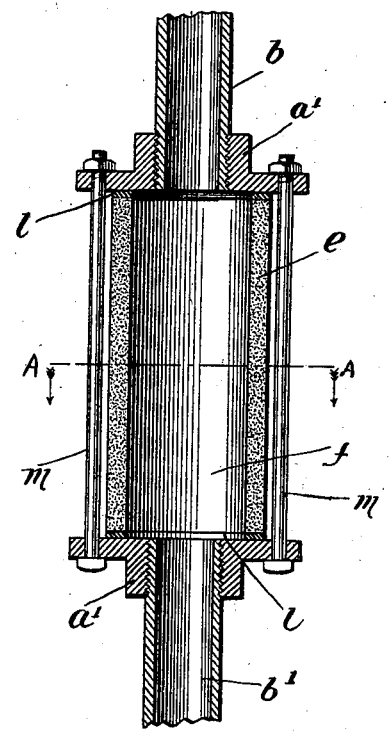
Figure 5:
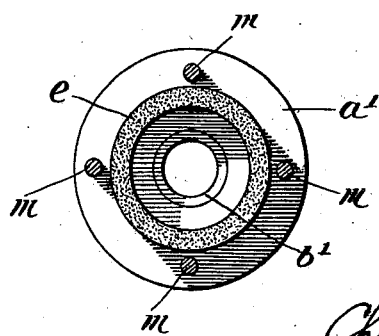

In the accompanying drawings, Figure 1 is a perspective view of my improved liquid-elevator. Fig. 2 is a longitudinal vertical sectional view of the same. Fig. 3 is an illustrative view of a portion of a steam-heating system, showing my liquid-elevator applied thereto. Fig. 4 is a longitudinal vertical sectional view of a modification of the liquid-elevator, and Fig. 5 is a horizontal sectional view of the same on the line A A of Fig. 4.

$a$ is the liquid-elevator, which is interposed in the pipe or passage $b\, b'$, through which the liquid passes. As shown in Figs. 1, 2, and 3, this liquid-elevator consists of an outer body or casing having openings $d\, d'$ at its ends, which communicate with the pipe or passage $b\, b'$, and an internal tubular porous partition $e$, dividing the body internally into an inner tubular passage-way $f$, through the partition $e$, and an outer chamber $g$, surrounding the partition. The outer body $a$ is provided with one or more small perforations $h$, opening into the chamber $g$. The passage-way $f$ within the tubular partition communicates through the openings $d\, d'$ with the pipe or passage-way $b\, b'$ and forms a part of the liquid-conduit.

The particular form and construction of the outer body is not essential; but I prefer the construction shown, in which the body is composed of two cup-shaped members $i\, i$, provided with flanged rims $j$, by which the two parts may be secured together by screws or bolts $k$. I prefer this construction not only because it enables the parts to be assembled with ease, but also because it enlarges the chamber $g$ about the partition.

The partition $e$ is seated at its ends on the inner faces of the body $a$, adjacent to the openings $d\, d'$, and is firmly clamped in place between the two parts $i\, i$. In practice the seats of the partition $e$ upon the inner faces of the body $c$ are made water and air tight by suitable gaskets $l$. The flanges $j\, j$ may be similarly packed.

The partition *e* is composed in whole or in part of a porous material pervious to the air, but impervious to steam, and offering a barrier to the passage of water except in minute quantities. Carbon, either solid or granular and molded with a suitable plastic, is excellently suited for this purpose; but I do not mean to limit myself to the use of this material, as any other material may be used which has the proper porosity.

The operation of the device is as follows: The liquid in the pipe *b'* is drawn up through the passage-way *f* and pipe *b* by suction or a partial vacuum in the pipe *b*. The suction or partial vacuum thus created in the passage-way *f* draws air through the porous partition *e* into the column of water and to a greater or less extent aerates the liquid or fills it with bubbles or air-pistons, so that on the well-known principle of the elevation of liquids the liquid may be elevated with much less suction or to a greater height than would be possible with the same suction acting on a solid column of liquid. Such water as may pass through the partition, if for any reason, accidental or otherwise, the partial vacuum in the conduit is broken, enters the chamber *g* and will not escape into the room until it accumulates in sufficient quantity to rise above the perforations *h*, and even then but small quantity can escape owing to the small size of the openings. As the partition *e* is impervious to steam, it is impossible, if steam enters the passage-way *f*, as is liable to occur at times in steam heating apparatus, for the steam to escape into the room. Such steam in forcing its way into the partition *e* is condensed and exudes into the chamber *g* in the form of water.

In the construction shown in Figs. 4 and 5 the outer covering or casing *a* is omitted. The porous section *e* is clamped between disks *a' a'*, which receive the pipes *b b'* and are fastened together by bolts *m*.

My liquid-elevating apparatus may be applied to a variety of uses. For purposes of illustration I have shown it applied to a steam heating apparatus in which a partial vacuum is employed to return the water of condensation. In such systems it frequently occurs that owing to structural conditions it is necessary to lift the water from a radiator or trap to such a height as would ordinarily be impossible or could be accomplished only by the maintenance of a high partial vacuum. In such cases the introduction of my water-elevating appliance in the return-pipe enables the water of condensation to be lifted with less suction or to greater elevations than would otherwise be possible. This application of my invention is shown in Fig. 3, in which *c* is a radiatory device and *m* the return therefrom, in which a partial vacuum is maintained by a pump or other exhausting apparatus *n*. The elevating device *a* is introduced at some point in the return *m*, preferably as low as possible, and acts in the manner described to aerate the column of water of condensation in the return and enable it to be lifted to a greater height or with less suction than would otherwise be possible.

The details of construction that have been shown may be varied without departing from my invention.

What I claim as new, and desire to secure by Letters Patent, is as follows:

1. In liquid-elevating apparatus, the combination of a liquid-conduit having a portion of its wall formed of porous material and an outer casing covering said porous portion and provided with an air-inlet, whereby air may enter through said inlet and porous wall into the column of water passing through said liquid-conduit.

2. In liquid-elevating apparatus, the combination of a liquid-conduit having a portion of its wall formed of porous material, means to create a partial vacuum in said conduit and an outer casing covering said porous portion and provided with an air-inlet, whereby air may be drawn through said inlet and porous wall into the column of water passing through said liquid-conduit.

3. In liquid-elevating apparatus, the combination of a liquid-conduit having a portion of its wall formed of porous material, and means to create a partial vacuum in said conduit, whereby air may be drawn through said porous wall into the column of water passing through said liquid-conduit.

4. In a liquid-elevating apparatus, the combination of a liquid-conduit, provided with a section having walls of porous material, and an outer casing inclosing said porous section and forming an outer chamber and provided with an air-inlet of limited area.

5. In a liquid-elevating apparatus, the combination of the pipes *b b'*, a tubular portion of porous material forming a communicating passage-way between said pipes, and an outer casing surrounding said tubular portion of porous material and provided with an air-inlet, said outer casing consisting of sections carried by the pipes *b b'* and clamping the tubular portion between them.

In testimony of which invention I have hereunto set my hand.

CHARLES H. ATKINS.

Witnesses:
ERNEST HOWARD HUNTER,
J. W. KENWORTHY.